US008005365B1

(12) United States Patent
Hoke et al.

(10) Patent No.: US 8,005,365 B1
(45) Date of Patent: Aug. 23, 2011

(54) RADIO FREQUENCY SIGNAL TRANSFER SYSTEM

(75) Inventors: Terry L. Hoke, Farmington, MN (US); Jesse R. Prusi, Lauderdale, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 962 days.

(21) Appl. No.: 11/821,857

(22) Filed: Jun. 26, 2007

(51) Int. Cl.
*H04B 10/00* (2006.01)
*H04J 14/00* (2006.01)

(52) U.S. Cl. ............................ 398/115; 398/116; 398/57

(58) Field of Classification Search .................... 398/45, 398/48, 115–117, 57
See application file for complete search history.

(56) References Cited

U.S. PATENT DOCUMENTS

| | | | | |
|---|---|---|---|---|
| 5,682,256 | A * | 10/1997 | Motley et al. ................. | 398/115 |
| 7,373,143 | B2 * | 5/2008 | Dygert .......................... | 455/418 |
| 2002/0181874 | A1 * | 12/2002 | Tulchinsky et al. ............ | 385/39 |
| 2002/0197984 | A1 * | 12/2002 | Monin et al. ................... | 455/419 |
| 2006/0172775 | A1 * | 8/2006 | Conyers et al. ................ | 455/561 |
| 2007/0264009 | A1 * | 11/2007 | Sabat et al. ..................... | 398/5 |

OTHER PUBLICATIONS

Antenna Research Associates. "Fiber Optic Link Systems RF and Digital". http://www.ara-inc.com/PDF-RF/112-113.pdf.

* cited by examiner

*Primary Examiner* — Dalzid Singh
(74) *Attorney, Agent, or Firm* — Brooks, Cameron & Huebsch, PLLC

(57) ABSTRACT

Embodiments of the present disclosure provide various methods, apparatuses, and systems for providing a radio frequency signal transfer system. One embodiment includes a number of radios, a number of antennas, electrical/optical shelves, a number of fiber optic paths to carry an optical RF signal, at least one optical switch to route an optical RF signal, and a host computing device. The electrical/optical shelves can transmit and receive electrical and optical RF signals, convert electrical RF signals to optical RF signals, and convert optical RF signals to electrical RF signals. The optical RF signals transmitted by an electrical/optical shelf are routed through at least one optical switch on any number of the fiber optic paths to another electrical/optical shelf. The electrical RF signals received by an electrical/optical shelf from a radio or antenna and are transmitted by an electrical/optical shelf to a radio or antenna.

22 Claims, 5 Drawing Sheets

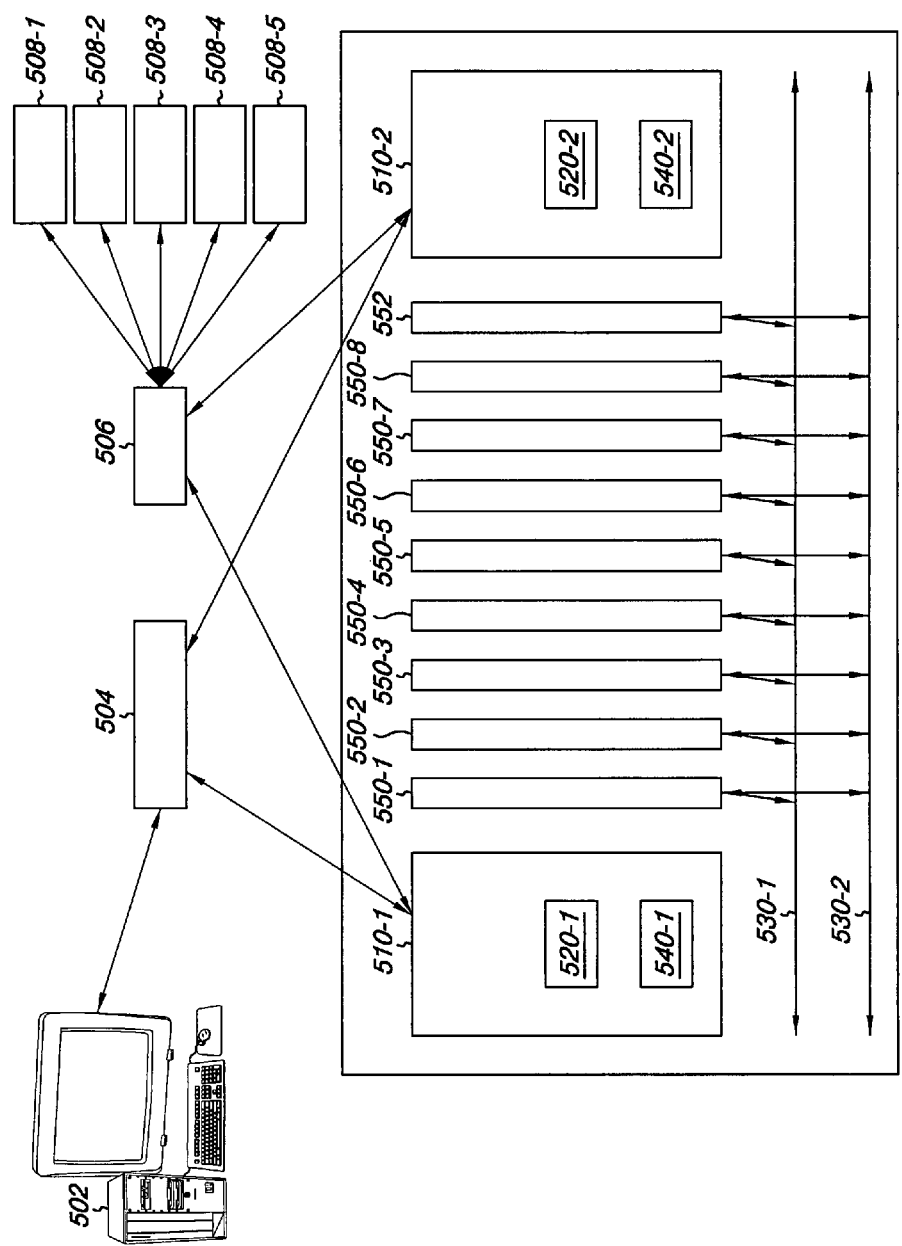

RADIO FREQUENCY SIGNAL TRANSFER SYSTEM

FIELD OF THE DISCLOSURE

The present disclosure generally relates to radio systems. And, in particular, the present disclosure relates to radio frequency (RF) signal transfer systems using a network-centric, switched fiber optic media, RF conversion shelf.

BACKGROUND

Radio systems are used to perform multiple functions in various environments, including environments that result in less than ideal operating conditions. In such environments a robust radio system is used. Such radio systems have to be able to operate under exposure to extreme temperatures, vibrations, and/or moisture that can be constantly changing and be different at various locations throughout the radio system.

Also, radios with different functions can be used to create a multi-function radio system. A multi-function radio system can, for example, perform all or some of the desired radio-type functions for a given application, while reducing the amount of equipment utilized to perform the desired radio-type functions.

In various radio systems, a radio network utilizing many radios and antennas can be used to allow a given radio in the system to operate in a given location for a given function. Many radios can be combined to function as a system that can meet the operational and environmental demands for the radio system. Currently, a typical radio system has several radios and several, wherein each radio is connected to a single antenna in the system. Therefore, these radio systems require an antenna and a radio for each desired function of the system. However, such systems have not been able to perform all of the desired functions for an application yet withstand the rigors of an extreme operating environment due to the inflexible nature of the system and the large amount of equipment the system utilizes.

SUMMARY

Embodiments of the present disclosure provide various methods, apparatuses, and systems for providing a radio frequency signal transfer system. For example in some embodiments, a radio system with network-centric features includes electrical/optical shelves and a number of optical switches to transmit electrical signals between a system of radios and antennas. In some embodiments, the system is connected to a host computer on a local area network (LAN) that allows the electrical/optical shelves and the optical switches to be programmed to allow the electrical signals from any radio and/or antenna to be routed to any other radio and/or antenna in the system.

In various embodiments, an RF signal transfer system can include of a number of radios that transmit and receive electrical signals. Such embodiments also include bidirectional electrical/optical shelves with transceivers to receive electrical signal input and transmit optical signal output and also to receive optical signal input and to transmit electrical signal output.

Such embodiments can include a number of optical switches. For example, a first and a second optical switch can be utilized to route one or more optical signals. In such embodiments, the electrical/optical shelves, the first optical switch, and the second optical switch are coupled together by fiber optic interconnects. A number of antennas can be used to transmit and receive electrical signals.

In various embodiments, the electrical/optical shelves are programmable (e.g., using device executable instructions) to route the optical signal on a desired fiber optical path and the electrical/optical shelves can be connected to a LAN. A host computing device can be used to communicate to the electrical/optical shelves through the LAN to route the optical signal on a desired optical path.

This allows the electrical signal from one or more of the number of radios to be routed to one or more of the number of antennas and the electrical signal from one or more of the number of antenna to be routed to one or more of the number of radios, wherein any one radio can be connected to any one antenna at a given time.

In some embodiments, a method for operating a radio system includes operating a number of radios, wherein each radio is configured to operate on a number of channels at one or more radio frequencies to produce and to receive RF electrical signals. The signals can be converted to optical signals and optical signals can be transferred in a number of fiber optic paths.

In such embodiments, optical signals can be routed with a number of optical switches and optical signals can be converted to electrical signals. Electrical signals can then be transferred to a number of antennas and transferred to a number of radios.

In various embodiments, the radio system can be connected to a LAN with a host computing device. The host computing device can be used to execute device readable instructions stored on a device readable medium to configure the number of radios to operate on a particular channel and/or at a particular frequency and/or to route the optical signals on a particular fiber optic path. Also, in such embodiments the host computing device can be used to execute instructions stored on a device readable medium to send an electrical signal from a particular radio to a particular antenna and to send an electrical signal from a particular antenna to a particular radio.

In various embodiments, a radio system can include a number of radios, wherein each radio can be configured to operate on a number of channels at one or more radio frequencies to produce an electrical RF signal. In such embodiments, the signal can be converted by a first shelf to an optical RF signal. A number of fiber optic paths can be used to carry the optical RF signal to a number of optical switches.

In various embodiments, the optical RF signal can be routed to a second shelf. The second shelf can convert the optical RF signal to an electrical RF signal.

In such embodiments, the electrical RF signal is routed to a number of antennas. Also, in various embodiments, a host computing device can configure the radios to operate on a particular channel and/or at a particular frequency.

In various embodiments, the first shelf can be connected to a LAN and can be programmable to dynamically and automatically route the optical signal on a desired fiber optical path. A host computing device communicates to the first shelf through the LAN to route the optical signal on a desired optical path.

Also, in various embodiments, the second shelf can be connected to a LAN and a host computing device communicates to the second shelf through the LAN to route the optical signal on a desired optical path. This allows the electrical signal from one or more of the number of radios to be routed to one or more of the number of antennas and also the electrical signal from one or more of the number of antennas to be routed to one or more of the number of radios.

BRIEF DESCRIPTION OF THE DRAWINGS

FIG. 5 illustrates system control architecture in a radio system according to an embodiment of the present disclosure.

DETAILED DESCRIPTION

Figure 1:
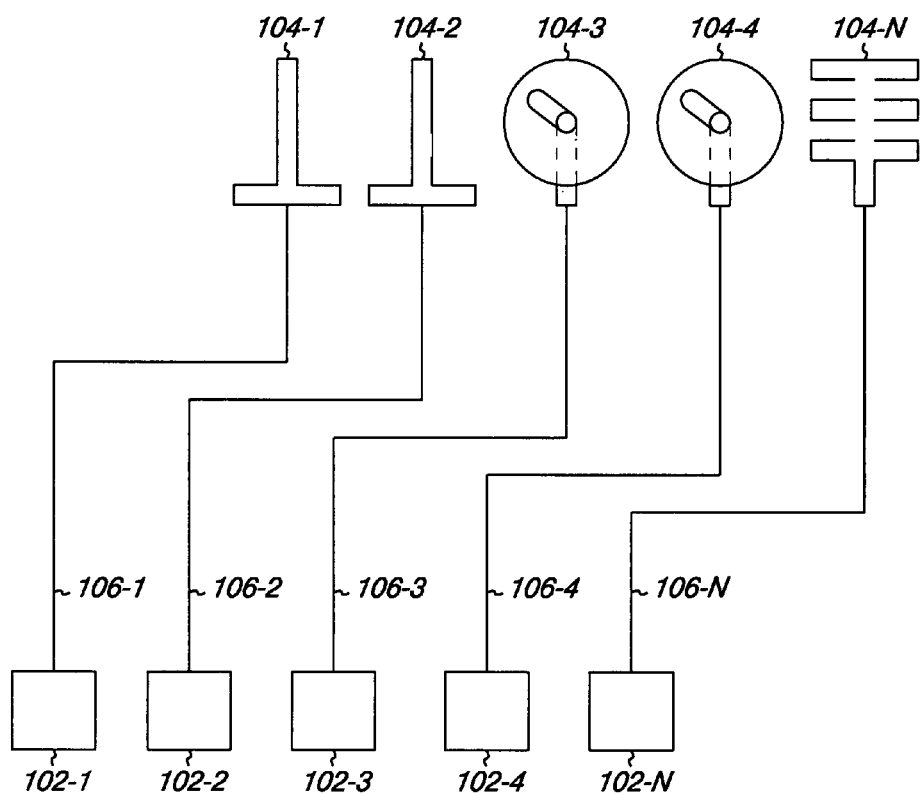
FIG. 1 illustrates a prior art radio system having a number of radios connected in series to a number of antennas.

Embodiments of the present disclosure provide various methods, apparatuses, and systems for providing a radio frequency signal transfer system. Various embodiments include a number of radios, a number of antennas, electrical/optical shelves, and at least one optical switch.

In various embodiments, a radio signal can be sent from a radio to an antenna through a radio frequency signal transfer system. In such embodiments, an electrical signal can be sent from a radio to an electrical/optical shelf.

At the electrical/optical shelf, the signal can be converted to an optical signal. Once the signal is an optical signal, it can be routed through a number of switches via fiber optics to another electrical/optical shelf.

The optical signal is converted to an electrical signal at the electrical/optical shelf. The electrical signal can then be sent from the electrical/optical shelf to an antenna. In such a manner, a signal from one or more radios can be sent one or more antennas, thus allowing a signal from a particular radio to be sent to a particular antenna in the system according to an embodiment of the present disclosure.

In various embodiments, a radio signal can be sent from an antenna to a radio through a radio frequency signal transfer system. In such embodiments, an electrical signal can be sent from an antenna to an electrical/optical shelf.

At the electrical/optical shelf, the signal can be converted to an optical signal. Once the signal is an optical signal, it can be routed through a number of switches via fiber optics to another electrical/optical shelf.

The optical signal is converted to an electrical signal at the electrical/optical shelf. The electrical signal can then be sent from the electrical/optical shelf to a radio. In such a manner, a signal from one or more antennas can be sent one or more radios, thus allowing a signal from a particular antenna to be sent to a particular radio in the system according to an embodiment of the present disclosure.

In embodiments such as those disclosed above, the electrical/optical shelves are bidirectional and can, for example, receive an electrical signal, convert it to an optical signal, and transmit an optical signal; and also receive an optical signal, convert it to an electrical signal, and transmit the electrical signal. The optical signals that are transmitted from the electrical/optical shelves through fiber optic interconnects are routed to the electrical/optical shelves by the optical switches through fiber optic interconnects.

Embodiments of the present disclosure are described in relation to the accompanying drawings, which will at least assist in illustrating the various features of the various embodiments. In the Figures, the first digit of a reference number refers to the Figure in which it is used, while the remaining two digits of the reference number refer to the same or equivalent parts of embodiment(s) of the present disclosure used throughout the several figures of the drawing. The scaling of the figures does not represent precise dimensions and/or dimensional ratios of the various elements illustrated herein.

FIG. 1 illustrates a prior art radio system having a number of radios connected in series to a number of antennas. The radio system shown in FIG. 1 includes a number of radios 102-1, 102-2, 102-3, 102-4, 102-N that are connected to a corresponding number of antennas 104-1, 104-2, 104-3, 104-4, 104-N. The radios 102-1 . . . 102-N are connected to the antennas 104-1 . . . 104-N by a number of connections 106-1, 106-2, 106-3, 106-4, 106-N. The connections 106-1 . . . 106-N provide electrical connections, which can be co-axial cable, insulated wire, and/or other connection types that provide a direct contact between the radios 102-1 . . . 102-N and the antennas 104-1 . . . 104-N.

The radios in the radio system in the embodiment of FIG. 1 each correspond to a different antenna. For example, radio 102-1 is connected to antenna 104-1 with connection 106-1. Such correspondence allows for the radio and antenna to be in direct contact at all times, unless the contact is broken. When the contact is broken, the connection is physically disconnected usually in an irreparable manner (e.g., damage or disconnection of a radio, antenna, and/or connection).

Figure 2:
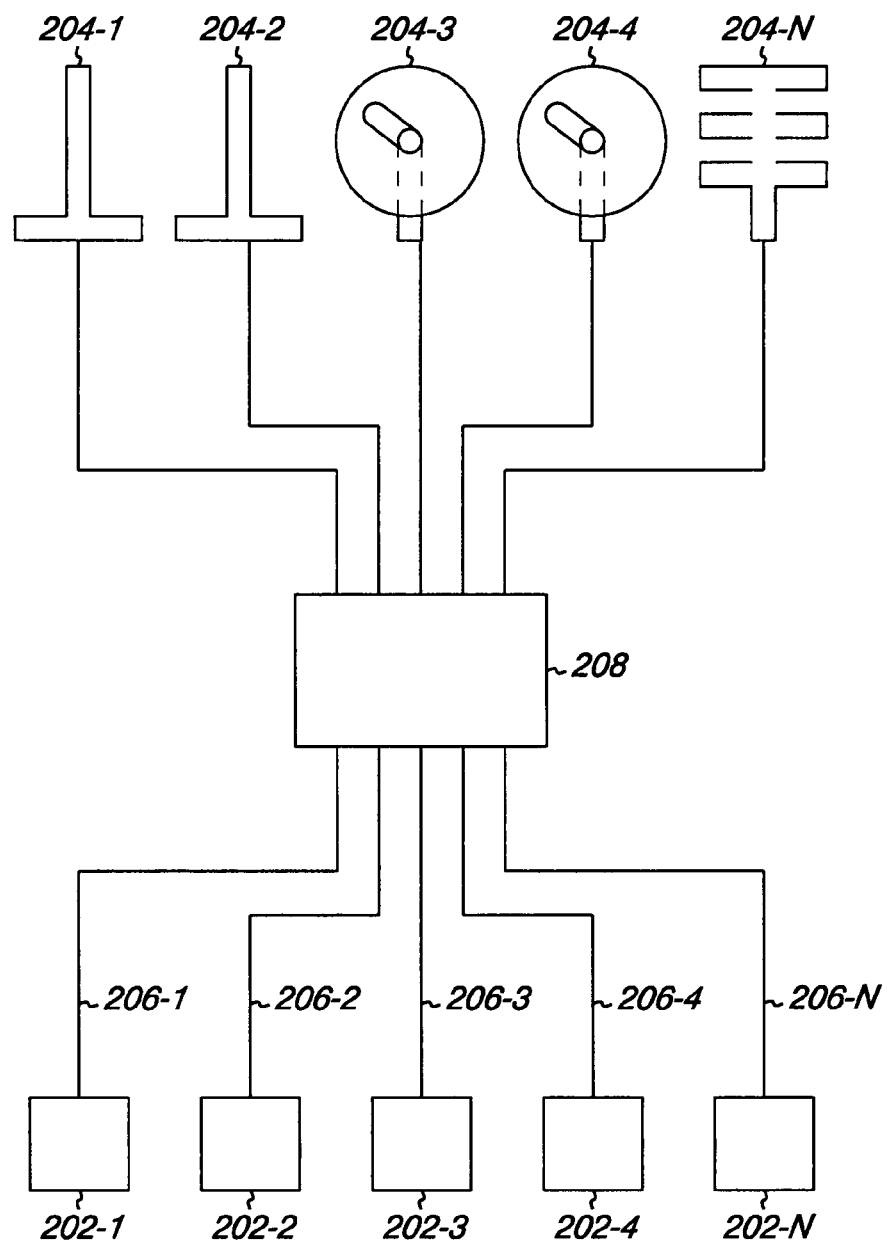
FIG. 2 illustrates a radio system according to an embodiment of the present disclosure.

FIG. 2 illustrates a radio system according to an embodiment of the present disclosure. As shown in FIG. 2, a radio system is shown that has the beneficial feature where the radios and antennas are connected to a router that allow the signals from one or more of the radios to be routed to one or more the antennas and the signals from one or more of the antennas to be routed to one or more of the radios, wherein any one radio can be connected to any one antenna at a given time.

In FIG. 2, a number of radios 202-1, 202-2, 202-3, 202-4, 202-N are connected to a router 208. The radios are connected to the router 208 by a number of electrical connections 206-1, 206-2, 206-3, 206-4, 206-N.

Also, a number of antennas 204-1 . . . 204-N are connected to the router 208. The antennas are connected to the router 208 by a number of electrical connections 210-1, 210-2, 210-3, 210-4, 210-N. The electrical connections 206-1 . . . 206-N and 210-1 . . . 210-N can be co-axial cable, insulated wire, and/or any other connection that provides a wired contact between the radios 102-1 . . . 102-N and the antennas 104-1 . . . 104-N.

In some embodiments, the router can allow any radio to utilize any antenna or multiple antennas for transmission of a communication, wherein any one radio can be connected to any one antenna at a given time. The router 208 in the radio system shown in FIG. 2 allows the signal from one or more of the radios 202-1 . . . 202-N to be routed to one or more of the antennas 204-1 . . . 204-N. The electrical connections 206-1 . . . 206-N and 210-1 . . . 210-N can vary in length from a few inches to hundreds of feet or more, in some implementations.

As discussed above, the router allows a radio 202-1 . . . 202-N to use any of the antennas 204-1 . . . 204-N in the radio system depending on the type of desired function for the radio and/or the desired location of where the radio signal is to be sent, among other selection factors. This feature also can be beneficial in allowing a radio 202-1 . . . 202-N to continue to operate if an antenna 204-1 . . . 204-N is disconnected from the router 208 (i.e., the radio signal can be routed to a different antenna 204-1 . . . 204-N in the radio system). This can be particularly useful in portable and/or military implementations where movement or damage to the system my necessitate use of a different antenna/radio combination.

Figure 3:
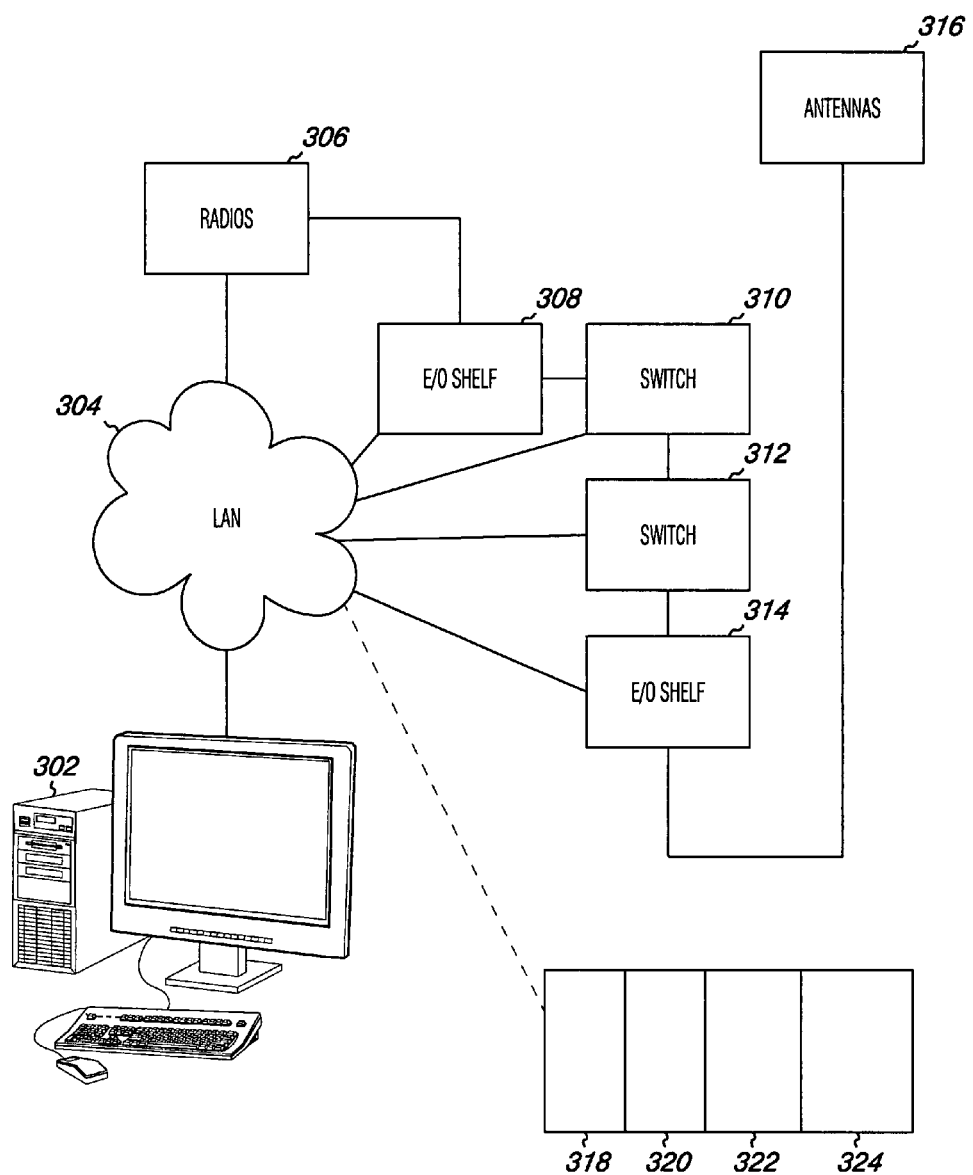
FIG. 3 illustrates the components of a network centric radio system according to an embodiment of the present disclosure.

FIG. 3 illustrates the components of a network centric radio system according to an embodiment of the present disclosure.

The radio system embodiment illustrated in FIG. 3 includes a host computing device 302, LAN 304, a number of radios 306, a first electrical/optical (e/o) transceiver shelf 308, optical switches 310 and 312, a second electrical/optical (e/o) transceiver shelf 314, and a system of antennas 316.

The radios 306 include one or more radios that can function at one or more frequencies and perform one or more functions. In various embodiments, the radio system functions by connecting the signal from a radio to an antenna or connecting the signal from an antenna to a radio in the system.

When sending a signal from a radio to an antenna, the signal is sent from a radio to an antenna by converting the electrical signal from the radio to an optical signal in electrical/optical transceiver shelf 308. The optical signal is then directed through the system by the optical switches 310 and/or 312.

The optical signal is directed from switch 312 to electrical/optical shelf 314. From electrical/optical shelf 314, the signal, which is now electrical again, is directed to an antenna 316 in the radio system.

When sending a signal from an antenna to a radio, the signal is sent from an antenna to a radio by converting the electrical signal from the antenna to an optical signal in electrical/optical transceiver shelf 314. The optical signal is then directed through the system by the optical switches 310 and/or 312.

The optical signal is directed from switch 310 to electrical/optical shelf 308. From electrical/optical shelf 308, the signal, which is now electrical again, is directed to an antenna 316 in the radio system.

The radio system embodiment illustrated in FIG. 3 includes LAN 304. The LAN 304 is connected to a host computing device 302.

The host computing device 302 provides the routing instructions stored in memory thereon or associated therewith to direct the signals from the radios 306 or the antennas 316 to one or more selected destinations. The ability of the host computing device 302 to provide routing instructions for the signals from the radios 306 or the antennas 316 allows the signal from any radio in the system to be sent to any antenna in the system or the signal from any antenna in the system to be sent to any radio in the system.

The host computing device 302 can be programmed to automatically communicate instructions to one or more components of the fiber optic radio frequency conversion shelf system to control the routing and/or conversion of the RF signals. The host computing device 302 can also be manually controlled by an operator to provide instructions in real time to one or more components of the fiber optic radio frequency conversion shelf system to control the routing and/or conversion of the RF signals.

The radios 306 are also connected to the LAN 304. This allows the system of radios 306 to be programmed by the host computing device 302 to operate each radio at variable frequencies and/or to perform various other functions.

The LAN 304 is connected to the microprocessors 318, the power supplies 320, the electrical/optical transceivers 322 and 324 associated with the electrical/optical transceiver shelves 308 and/or 314. This allows the microprocessors 318, the power supplies 320, the electrical/optical transceivers 322 and 324 to receive communications and instructions from the LAN.

Figure 4:
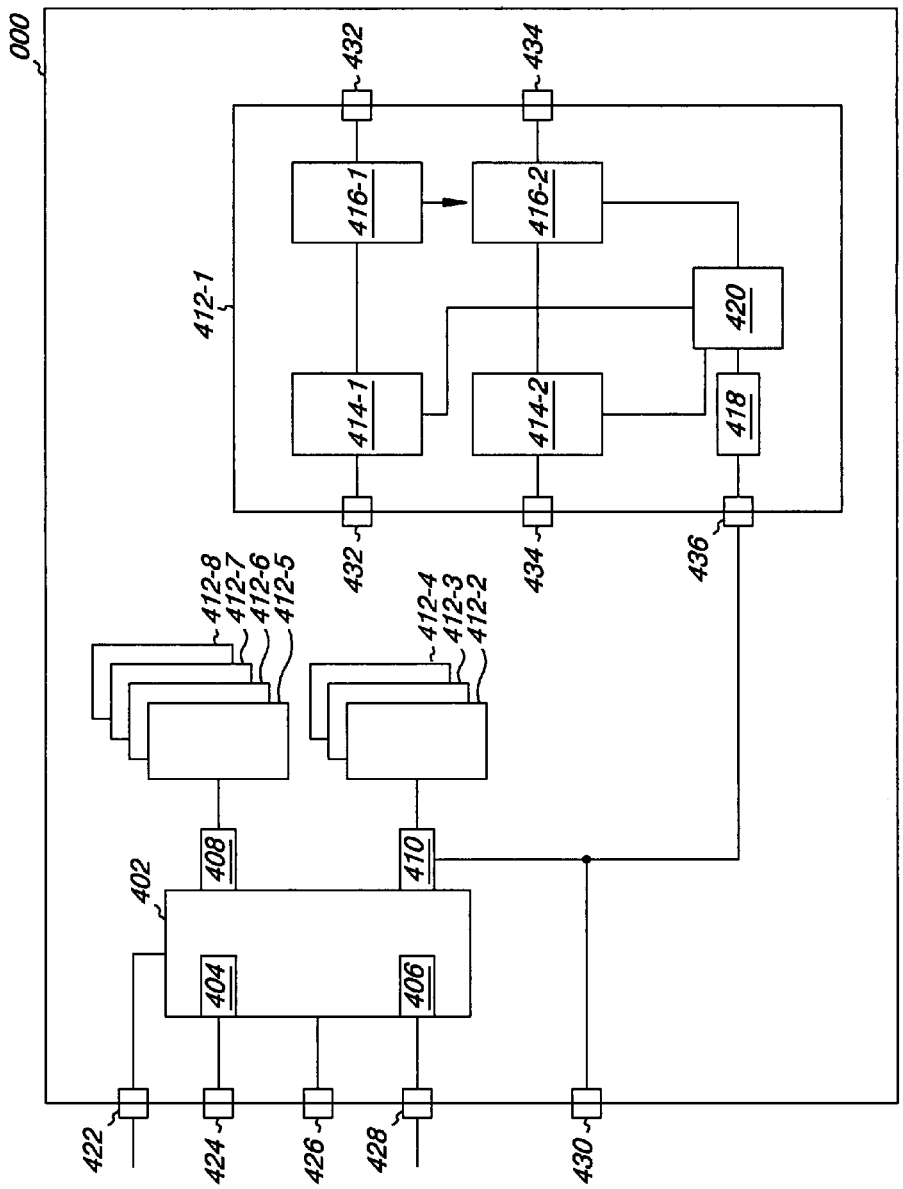
FIG. 4 illustrates an electrical/optical transceiver shelf used in a radio system according to an embodiment of the present disclosure.

FIG. 4 illustrates an electrical/optical transceiver shelf used in a radio system according to an embodiment of the present disclosure. The transceiver shelf in FIG. 4 converts electrical signals from the radios or antennas to optical signals and converts optical signals to electrical signals.

This is useful because the optical signals can be transmitted through fibers, which are smaller and provide greater bandwidth than conventional coaxial cables. Also, the optical signal can be routed to various locations in the radio system by the optical switches in conjunction with the LAN and the host computing device.

The transceiver shelf has a microprocessor 402 that is interfaced with the host computing device through a LAN to allow the transceiver to be programmable. This can also allow inputs from a radio in the system to be converted and/or routed through the system to any of the antennas in the system or inputs from an antenna to be converted and/or routed through the system to any of the radios in the system.

In the embodiment of FIG. 4, the microprocessor 402 interfaces with the host computing device to receive programming instructions. The programming instructions are received by the LAN simple network management protocol (SNMP) ports 424 and/or 428 that are connected to network interface cards (NIC) 404 and/or 406 in the microprocessor 402.

The microprocessor 402 interfaces with the radios or antennas to select the electrical signal that the transceiver will receive. The microprocessor 402 interfaces with the cards 412-1, 412-2, 412-3, 412-4, 412-5, 412-6, 412-7, and/or 412-8 through the controller area network (CAN) controllers 408 and/or 410 to determine the slot that each card is located in and also the filtering that is on each card 412-1 . . . 412-8.

The microprocessor 402 also has a GPS timing input 422, a serial/USB port 426, and a CAN bus input 430. These inputs allow the host computing device to control the radio and antenna signal inputs into the transceiver shelf for the conversion of the electrical signal to an optical signal and for the routing of the signals.

The signal from a radio or antenna in the system is sent to a card in the transceiver shelf according the programming instructions from the host computing device. The transceiver receives the signal and sends the signal to the correct card 412-1 . . . 412-8 and the correct channel on the card 432 and/or 434 according the programming instructions the microprocessor 402 received from the host computing device.

Once the microprocessor 402 has sent the signal to the correct card 412-1 . . . 412-8 the signal is processed from an electrical signal to an optical signal. The signal enters the card through a CAN serial port 436 and is sent to the CAN controller 418.

The signal is routed from the CAN controller 418 through the parallel/serial I/O adapter and analog/digital converter 420 to the agile filter 414-1 and/or 414-2 depending on the channel the signal was sent. The signal is conditioned in the agile filter 414-1, 414-2 and sent to the optical emitter, 416-1 or 416-2.

The optical emitters 416-1 and/or 416-2 send the optical signal from the card through ports 432 and/or 434 where the signal is sent through the system via fiber optics. The optical signal travels through the system and is routed through the optical switches to the other electrical/optical transceiver shelf.

FIG. 5 illustrates system control architecture in a radio system according to an embodiment of the present disclosure. For clarity, neither optical nor RF paths are shown in FIG. 5. In the embodiment of FIG. 5, the radio signals from the radio system are routed from the radio or antenna through the electrical/optical transceiver shelves via a controlled area network (CAN).

The system control architecture in FIG. 5 includes a host computing device 502 that is connected to a communication management network 504 that is on the LAN associated with the system control architecture. The host computing device communicates with communication management network through simple network management protocol (SNMP) requests.

The communication management network 504 is connected to the electrical/optical conversion shelf that contains the CAN controllers 510-1 and/or 510-2 and transceivers 550-1, 550-2, 550-3, 550-4, 550-5, 550-6, 550-7, 550-8. The CAN controllers 510-1, 510-2 each have a microprocessor 520-1 and/or 520-2 and a CAN interface 540-1 and/or 540-2 to manage the SNMP requests they receive from the communication management network 504.

The CAN controllers 510-1 and/or 510-2 can also be connected to a real time control device 506 that is part of the LAN. The real time control device 506 can be connected to the radios 508-1, 508-2, 508-3, 508-4, and/or 508-5 that each can operate on one or more channels. The real time control device can, for example, be utilized to receive the RF signals from the one or more radios 508-1, . . . , and/or 508-5 and route the signals to the CAN controllers 510-1 and/or 510-2.

The system control architecture also has a number of CAN buses 530-1 and/or 530-2 that can both be connected to the CAN controllers 510-1 and/or 510-2. The CAN buses 530-1, 530-2 are connected to the transceivers 550-1, . . . , 550-8 and route the RF signals to the transceivers 550-1, . . . , 550-8. A power supply 552 is part of the system control architecture to provide power to the transceivers 550-1, . . . , and/or 550-8 and the components of the CAN controllers 510-1 and/or 510-2.

The system control architecture in the embodiment shown in FIG. 5 operates by having the host computing device 502 on the LAN operate the communication management network 504. The host computing device 502 sends SNMP requests to the communication management network 504 to control the sending and routing of the RF signals through the fiber optic radio frequency conversion shelf system.

The host computing device 502 sends an SNMP request to the communication management network 504, which in turn routes the SNMP request to one of the CAN controllers 510-1 and/or 510-2. The microprocessors 520-1 and/or 520-2 on the CAN controllers 510-1 and/or 510-2 then process the SNMP request.

After the SNMP request is processed, the CAN controllers 510-1 and/or 510-2 communicate with the real time control device 506. The real time control device 506 is connected to the radios 508-1, . . . , and/or 508-5 and the CAN controllers 510-1 and/or 510-2.

The real time control device 506 can be utilized as the interface between the radios and the radio frequency conversion shelf. The real time control device receives the RF signals from the radios 508-1, . . . , and/or 508-5. The radios 508-1, . . . , 508-5 can operate on one or more channels, and the real time control device can receive the signals from the radios 508-1, . . . , and/or 508-5 operating on one or more frequencies.

The communication from the CAN controllers 510-1 and/or 510-2 to the real time control device 506 allows a desired RF signal from a radio 508-1, . . . , and/or 508-5 to be sent to a transceiver 550-1, . . . , and/or 550-8. The RF signal is transferred to the transceivers 550-1, . . . , and/or 550-8 through the CAN buses 530-1 and/or 530-2.

Once the RF signal is received by the transceivers 550-1, . . . , and/or 550-8, the RF signal can be processed through agile filters on the transceivers 550-1, . . . , and/or 550-8 and then converted from an electrical signal to an optical signal. The optical signal can then be routed through the optical switches to another electrical/optical shelf.

The optical signal is converted to an electrical signal by the agile filters in the transceivers. The electrical signal can then be routed to one or more antennas in the system. The routing of the electrical signals to the antennas can be controlled by the programming instructions of the host computing device.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure.

It is to be understood that the above description has been made in an illustrative fashion, and not a restrictive one. Combination of the above embodiments, and other embodiments not specifically described herein will be apparent to those of ordinary skill in the art upon reviewing the above description.

The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

What is claimed:

1. An optical radio frequency conversion shelf system, comprising:
    a number of radios that transmit and receive electrical signals;
    a first electrical/optical shelf with a number of transceivers to receive an electrical signal as an input and transmit an optical signal as an output and to receive the optical signal as an input and transmit the electrical signal as an output;
    a second electrical/optical shelf with a number of transceivers to receive the electrical signal as an input and transmit the optical signal as an output and to receive the optical signal as an input and transmit the electrical signal as an output;
    a first optical switch to route the optical signal;
    a second optical switch to route the optical signal, wherein the first electrical/optical shelf, the second electrical/optical shelf, the first optical switch, and the second optical switch are coupled together by fiber optic interconnects; and
    a number of antennas that transmit and receive electrical signals.

2. The system of claim 1, wherein the first electrical/optical shelf is programmable to configure the routing of the optical signal on a desired fiber optical path.

3. The system of claim 1, wherein the first electrical/optical shelf is connected to a local area network (LAN).

4. The system of claim 3, wherein a host computing device communicates to the first electrical/optical shelf through the LAN to route the optical signal on a desired optical path.

5. The system of claim 1, wherein the second electrical/optical shelf is connected to a LAN.

6. The system of claim 5, wherein a host computing device communicates to the second electrical/optical shelf through the LAN to route the optical signal on a desired optical path.

7. The system of claim 1, wherein the electrical signal from any of the number of radios can be routed to one or more of the number of antennas.

8. A method for operating a radio system, comprising:
connecting the radio system to a LAN with a host computing device;
operating a number of radios, wherein each radio is configured to operate on a number of channels at one or more radio frequencies to produce and to receive electrical RF signals;
operating a number of antennas, wherein each antenna is configured to transmit and receive electrical RF signals;
receiving electrical RF signals as an input at a first electrical/optical shelf from a number of radios;
converting the electrical RF signals to optical RF signals with the first electrical/optical shelf;
transferring the optical RF signals via a number of fiber optic paths;
routing the optical RF signals with a number of optical switches to a second electrical/optical shelf;
converting the optical RF signals to electrical RF signals with the second electrical/optical shelf;
transferring the electrical RF signals from the second electrical/optical shelf to a number of antennas;
transferring electrical RF signals converted from optical RF signals from the first electrical/optical shelf to the number of radios; and
executing, via the host computing device, device readable instructions stored on a device readable medium to send an electrical signal from at least one of:
a particular radio to a particular antenna; and
a particular antenna to a particular radio.

9. The method of claim 8, wherein the method includes using the host computing device to execute device readable instructions stored on a device readable medium to configure the number of radios to operate on a particular channel at a particular frequency.

10. The method of claim 8, wherein the method includes using the host computing device to execute device readable instructions stored on a device readable medium to route the optical signals on a particular fiber optic path.

11. A radio system, comprising:
a number of radios;
a number of antennas;
a first electrical/optical shelf, wherein the first shelf can convert an electrical RF signal to an optical RF signal and convert an optical RF signal to an electrical RF signal;
a number of fiber optic paths to carry an optical RF signal;
at least one optical switch to route an optical RF signal;
a second electrical/optical shelf, wherein the second shelf can convert an optical RF signal to an electrical RF signal and convert an electrical RF signal to an optical RF signal; and
a host computing device, wherein the host computing device configures the radios to operate on a channel at a frequency.

12. The system of claim 11, wherein the number of radios are configured to operate on one or more channels at one or more frequencies and to transmit electrical RF signals.

13. The system of claim 12, wherein the number of antennas are configured to receive electrical RF signals.

14. The system of claim 13, wherein the electrical RF signal from any of the number of radios is:
sent to the first shelf;
converted to an optical signal;
routed through at least one optical switch on any number of fiber optic paths to the second shelf;
converted to an electrical signal; and
sent to any of the number of antennas.

15. The system of claim 11, wherein the number of antennas are configured to operate on one or more channels at one or more frequencies and to receive electrical RF signals.

16. The system of claim 15, wherein the number of radios are configured to transmit electrical RF signals.

17. The system of claim 16, wherein an electrical RF signal from any of the number of antennas is:
sent to the second shelf;
converted to an optical signal;
routed through at least one optical switch on any number of the fiber optic paths to the first shelf;
converted to an electrical signal; and
sent to any of the number of radios.

18. The system of claim 11, wherein the first shelf is programmable to route the optical signal on a desired fiber optic path.

19. The system of claim 11, wherein the first shelf is connected to a LAN.

20. The system of claim 19, wherein a host computing device communicates to the first shelf through the LAN to route the optical signal on a desired optical path.

21. The system of claim 11, wherein the second shelf is connected to a LAN.

22. The system of claim 21, wherein a host computing device communicates to the second shelf through the LAN to route the optical signal on a desired optical path.

* * * * *